United States Patent
Janczak

(10) Patent No.: US 9,483,810 B2
(45) Date of Patent: Nov. 1, 2016

(54) REDUCING THE NUMBER OF IO REQUESTS TO MEMORY WHEN EXECUTING A PROGRAM THAT ITERATIVELY PROCESSES CONTIGUOUS DATA

(75) Inventor: Tomasz Janczak, Gdansk (PL)

(73) Assignee: Intel Corporation, Santa Clara, CA (US)

( * ) Notice: Subject to any disclaimer, the term of this patent is extended or adjusted under 35 U.S.C. 154(b) by 149 days.

(21) Appl. No.: 13/997,053

(22) PCT Filed: Dec. 28, 2011

(86) PCT No.: PCT/US2011/067462
§ 371 (c)(1),
(2), (4) Date: Apr. 24, 2014

(87) PCT Pub. No.: WO2013/100927
PCT Pub. Date: Jul. 4, 2013

(65) Prior Publication Data
US 2014/0327682 A1  Nov. 6, 2014

(51) Int. Cl.
*G06T 1/20* (2006.01)
*G06T 1/60* (2006.01)
*G06F 9/30* (2006.01)
*G06F 9/38* (2006.01)

(52) U.S. Cl.
CPC ............. *G06T 1/20* (2013.01); *G06F 9/30032* (2013.01); *G06F 9/30036* (2013.01); *G06F 9/30109* (2013.01); *G06F 9/30112* (2013.01); *G06F 9/30185* (2013.01); *G06F 9/3824* (2013.01); *G06F 9/3832* (2013.01); *G06T 1/60* (2013.01)

(58) Field of Classification Search
None
See application file for complete search history.

(56) References Cited

U.S. PATENT DOCUMENTS

| 5,673,321 | A | 9/1997 | Lee | |
|---|---|---|---|---|
| 7,376,813 | B2 | 5/2008 | Sankaran | |
| 7,680,988 | B1 * | 3/2010 | Nickolls | G06F 12/084 711/130 |
| 7,836,116 | B1 * | 11/2010 | Goodnight | G06F 9/3012 708/404 |

(Continued)

FOREIGN PATENT DOCUMENTS

| GB | 2464292 A | 4/2010 |
|---|---|---|
| WO | 2013/100927 A1 | 7/2013 |

OTHER PUBLICATIONS

International Preliminary Report on Patentability and Written Opinion received for PCT Patent Application No. PCT/US2011/067462, mailed on Jul. 10, 2014, 6 pages.

(Continued)

*Primary Examiner* — Xiao Wu
*Assistant Examiner* — Yu Chen
(74) *Attorney, Agent, or Firm* — Jordan IP Law LLC

(57) ABSTRACT

Methods and apparatuses to reduce the number of IO requests to memory when executing a program that iteratively processes contiguous data are provided. A first set of data elements may be loaded in a first register and a second set of data elements may be loaded in a second register. The first set of data elements and the second set of data elements can be used during the execution of a program to iteratively process the data elements. For each of a plurality of iterations, a corresponding set of data elements to be used during the execution of an operation for the iteration may be selected from the first set of data elements stored in the first register and the second set of data elements stored in the second register. In this way, the same data elements are not re-loaded from memory during each iteration.

22 Claims, 5 Drawing Sheets

(56) References Cited

U.S. PATENT DOCUMENTS

| | | | |
|---|---|---|---|
| 7,925,860 B1* | 4/2011 | Juffa | G06F 9/3455 |
| | | | 712/10 |
| 2005/0198473 A1 | 9/2005 | Ford | |
| 2008/0184007 A1* | 7/2008 | Codrescu | G06F 9/30036 |
| | | | 712/1 |
| 2011/0252204 A1* | 10/2011 | Coon | G06F 12/084 |
| | | | 711/150 |

OTHER PUBLICATIONS

International Search Report and Written Opinion received for PCT application No. PCT/US2011/067462, mailed on Sep. 21, 2012, 9 pages.

European Search Report for European Patent Application No. 11878695.3, mailed Jul. 4, 2016, 8 pages.

* cited by examiner

REDUCING THE NUMBER OF IO REQUESTS TO MEMORY WHEN EXECUTING A PROGRAM THAT ITERATIVELY PROCESSES CONTIGUOUS DATA

BACKGROUND

Parallel processing can be implemented in a computer system to achieve faster execution of applications over traditional sequential processing. For example, a single instruction multiple data (SIMD) instruction is an example parallel process where a single instruction is performed simultaneously on multiple data. Such SIMD instructions can help speed up data processing in applications including multimedia, video, audio encoding/decoding, 3-Dimensional (3-D) graphics, and image processing.

In a computer system that supports parallel processing, however, some of the same data elements may be re-used, for example, in several iterations of a signal processing operation (e.g., a graphics operation such as a filtering or convolution operation). For example, to process an image or part of an image, the same graphics instruction and input data may be iteratively applied to a plurality of pixels in the image. For each iteration of the graphics instruction, some of the same pixels from the previous iteration may be used. However, for each iteration, the data elements used by the graphics instructions may be re-loaded from memory, which can reduce the efficiency of the parallel processing architecture executing the graphics instructions.

BRIEF DESCRIPTION OF THE DRAWINGS

The various advantages of the embodiments of the present invention will become apparent to one skilled in the art by reading the following specification and appended claims, and by referencing the following drawings, in which:

DETAILED DESCRIPTION

Various implementations of this disclosure provide apparatuses and methods for reducing the number of IO requests to memory when executing a program that iteratively processes contiguous data.

Figure 1:
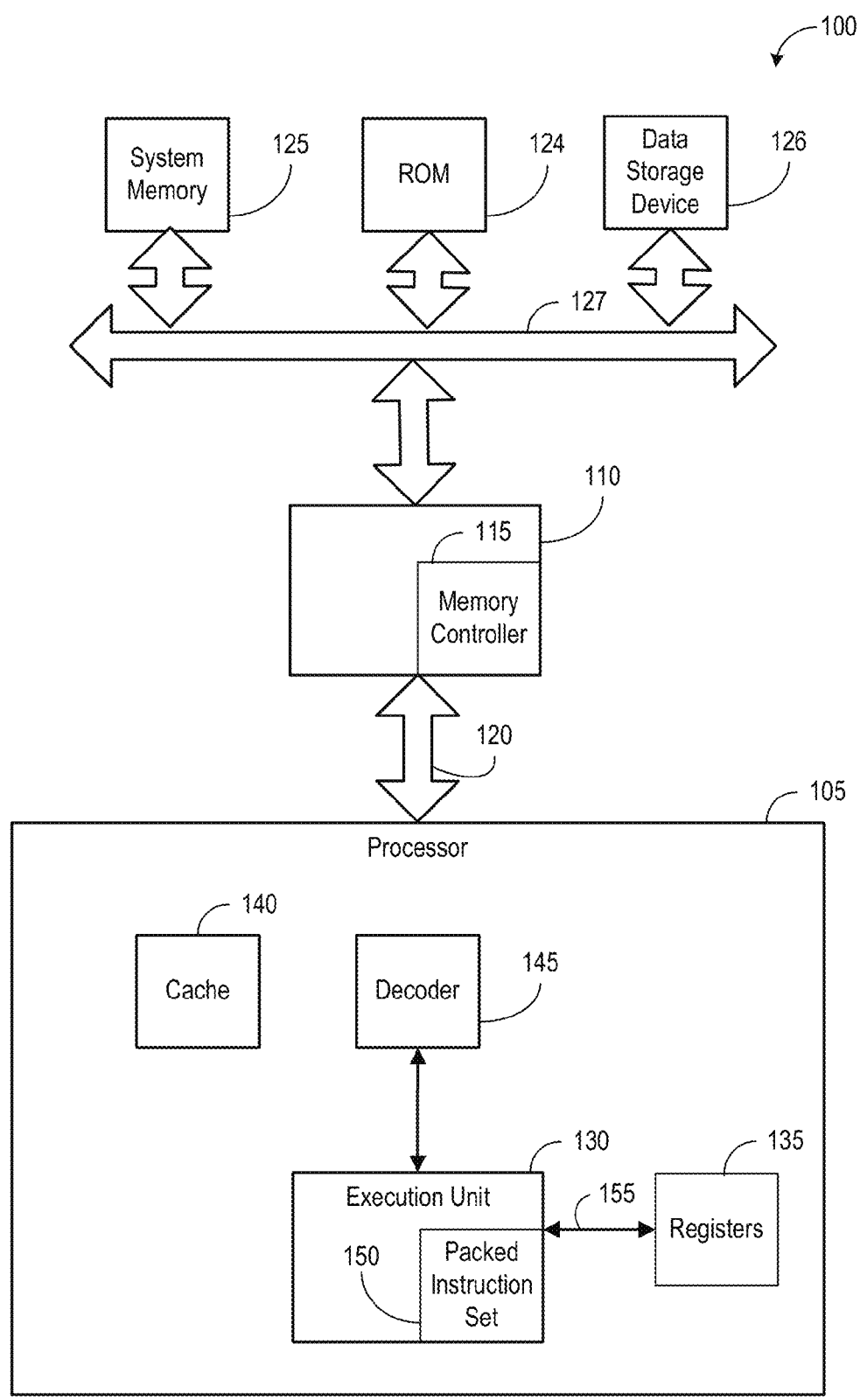
FIG. 1 is a block diagram illustrating an example computer system operable to reduce the number of IO requests to memory when executing a program that iteratively processes contiguous data according to an embodiment.

FIG. 1 illustrates an example computer system 100 operable to reduce the number of IO requests to memory when executing a program that iteratively processes contiguous data.

The system 100 can include a processor 105 coupled to a bus controller 110 via a CPU bus 120. The bus controller 110 can include a memory controller 115. In some implementations, the memory controller 115 can be external to the bus controller 110. The memory controller 115 can interface the processor 105 to a system memory 125 via a memory bus 127. In some implementations, the system memory 125 can be described as a "main memory" of the system 100.

In some implementations, the system memory 125 can store information and instructions to be executed by processor 105. The system memory 125 can store data that is to be accessed by the processor to implement, for example, code to execute graphic operations such as filtering or convolution operations or any other program that iteratively applies instructions to contiguous data elements. The system memory 125 may include dynamic random access memory (DRAM) modules that are accessed by the memory controller 115. In some implementations, the system memory 125 memory also can be used to store pixels that are part of one or more image frames to be processed. The system memory 125 also may be used for storing temporary variables or other intermediate information during execution of instructions by processor 105.

The computer system 100 also can include a read only memory (ROM) 124 (and/or other static storage device) coupled to the memory bus 127 to store static information and instructions for the processor 105. A data storage device 126 (e.g., a magnetic disk, optical disk, and/or other machine readable media) may also be coupled to memory bus 127 to store information and instructions for processor 105. For example, the data storage device 126 can include code to execute graphic operations such as filtering or convolution operations or any other program that iteratively applies instructions to contiguous data elements.

In some implementations, the processor 105 can include an execution unit 130, a plurality of registers 135, a cache 140, and a decoder 145.

The execution unit 130 can execute instructions received by processor 105. In addition to recognizing instructions typically implemented in general purpose processors, the illustrated execution unit 130 recognizes instructions in a packed instruction set 150 that perform operations on packed data formats.

The execution unit 130 may be coupled to the cache 140 and decoder 145. The cache 140 may be used to cache data and/or control signals from, for example, system memory 125. The decoder 145 may be used to decode instructions received by processor 105 into control signals and/or microcode entry points. In response to these control signals and/or microcode entry points, the illustrated execution unit 130 performs the appropriate operations.

The execution unit 130 may be coupled to the registers 135 by an internal bus 155. The registers 135 may be used to store information, including control/status information, integer data, floating point data, and packed data. The term "register" is not limited to a particular type of circuit. Rather, a register is any device capable of storing and providing data and performing the functions described herein.

Figure 2:
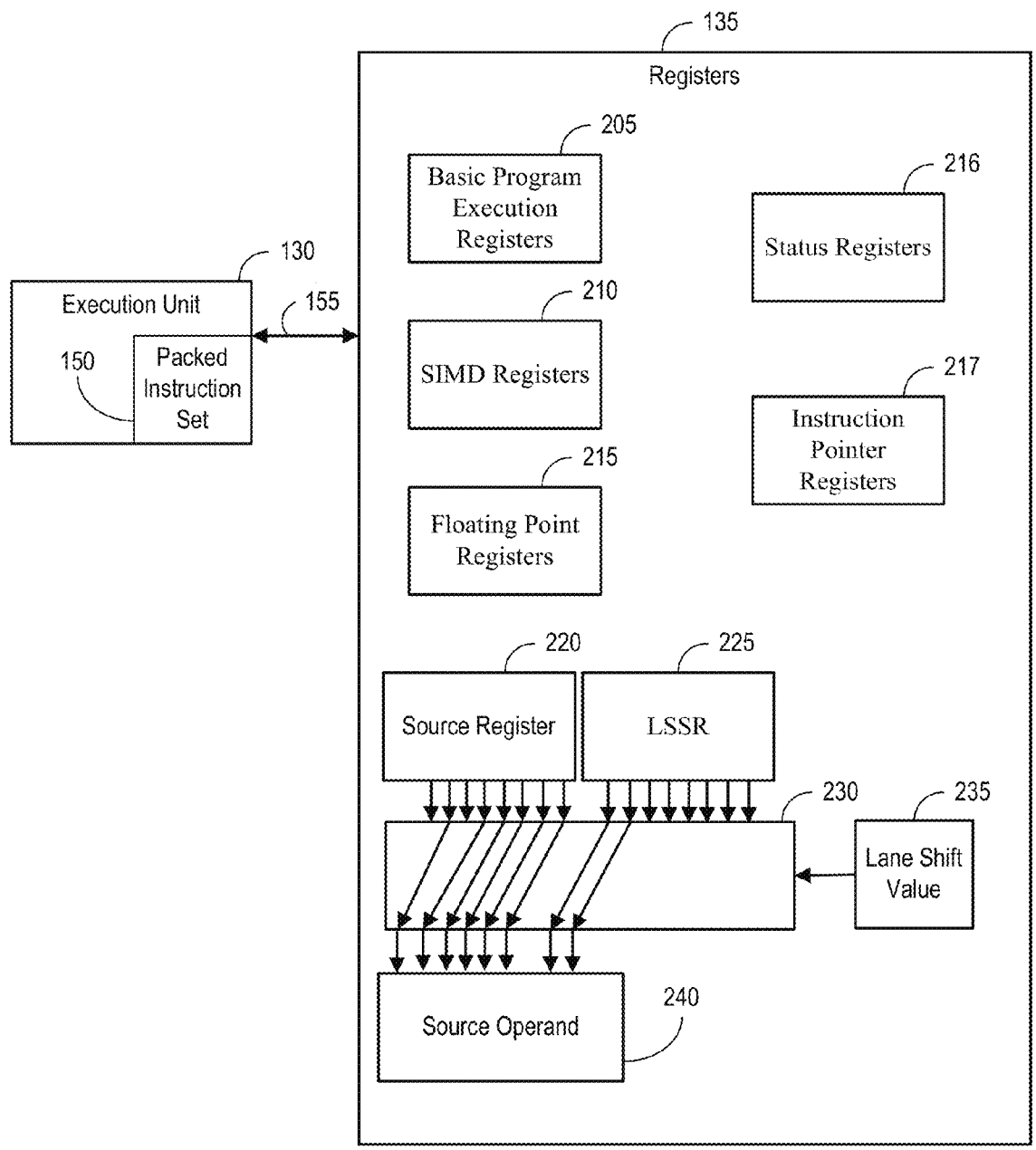
FIG. 2 is a block diagram illustrating example registers in the example computer system of FIG. 1.

In some implementations, as illustrated in FIG. 2, the registers 135 may include basic program execution registers 205, SIMD registers 210, and floating-point registers 215, status registers 216, and an instruction pointer register 217. To reduce the number of IO requests to memory when the processor 105 is executing a program that iteratively processes contiguous data, the registers 135 may also include a source register 220, a lane shift supplement register (LSSR) 225, a lane shift multiplexer 230, and a source operand register 240. In some implementations, the source register 220, LSSR 225, lane shift multiplexer 230, and the source operand register 240 are internal to execution unit 130.

The basic program execution registers 205 may store data associated with the execution of general purpose instructions. The basic program execution registers 205 may store, for example, byte (8 bits), word (2 bytes or 16 bits), and double word (4 bytes or 32-bits) integers.

The SIMD registers 210 may store data for performing SIMD operations. The SIMD registers may store, for example, quad word, 256 bits of data, 128-bit single precision and double precision floating-point values, and 128-bit packed byte, word, double word, and/or quad word integers.

The floating point registers 215 may store, for example, single precision, double precision, and double extended precision floating-point values. In addition, the floating point registers 215 may store word, double word, and quad word (8 bytes or 64 bits) integers, as well as binary coded decimal values.

The status registers 216 may store information indicating the status of processor 105. Instruction pointer register 217 may store the address of the next instruction to be executed.

As discussed above, for each iteration of an operation, some of the same data elements from a previous iteration may be used. For example, assume (e.g., as a "sixteen element example") that it is desirable to process data elements A15, A14, A13, A12, A11, A10, A9, A8, A7, A6, A5, A4, A3, A2, A1, and A0 in an iterative operation using one or more instructions executing one or more operations. Further assume that during each interaction, i, for i= 1, . . . , 8, it is desirable to process data elements A16-$i$, A15-$i$, . . . , A9-$i$. Thus, for example, for a first iteration (i.e., i=1), data elements A15, A14, . . . , A8 are processed; for a second iteration (i.e., i=2), data elements A14, A13, . . . , A7 are processed; for a third iteration (i.e., i=3), data elements A13, A12, . . . , A6 are processed; . . . , for a 8-th iteration (i.e., i=8), data elements A8, A7, . . . , A1 are processed. As may be seen, during each iteration, some of the same data elements from the previous iteration are used. In existing systems, the data elements are re-loaded from memory during each iteration.

As will be described with reference to FIG. 3 below, the source register 220, LSSR 225, lane shift multiplexer 230, and the source operand register 240 along with an operand modifier may be used to avoid loading these data elements from memory during each iteration of the operation. The operand modifier may cause the system 100 to process the data already stored in source register 220 and LSSR 225 to produce an operand to be stored at source operand register 240 for an iteration of the operation. In this way, data is not re-loaded from memory during each iteration of the operation.

Figure 3:
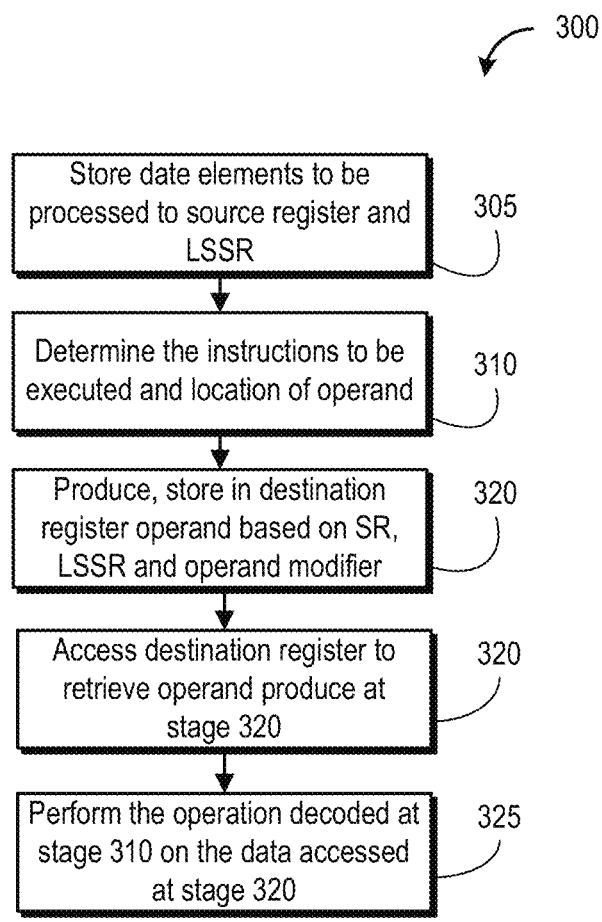
FIG. 3 is a flowchart of an example of a method of reducing the number of IO requests to memory when executing a program that iteratively processes contiguous data according to an embodiment.

FIG. 3 illustrates a process 300 to reduce the number of IO requests to memory when executing a program that iteratively processes contiguous data.

At stage 305, the data elements to be processed during the iterative execution of instructions are stored in source register 220 and LSSR 225. For the sixteen element example discussed above, data elements A7, A6, A5, A4, A3, A2, A1, and A0 may be stored to LSSR 225 and data elements A15, A14, A13, A12, A11, A10, A9, and A8 may be stored to source register 220.

During the first iteration, at stage 310, a control signal is received (e.g., from either the cache 160 or bus 120 of FIG. 1) and decoded (e.g., by decoder 165 of FIG. 1) to determine the instructions to be executed and the location of the data to be used to execute the instructions. It is assumed that the instructions include an operation having an operand modifier that cause the system to process the data stored in source register 220 and LSSR 225 to produce an operand to be used to execute the operation decoded at stage 310.

At stage 315, based on the instructions decoded at stage 310, the data stored in source register 200 and LSSR 225 are supplied to lane shift multiplexer 230. Furthermore, the operand modifier that indicates a lane shift value 235 is supplied to the lane shift multiplexer 230. The operand modifier can therefore instruct the lane shift multiplexer 230 on how to process the data stored in source register 200 and LSSR 225 to produce an operand, which is stored at source operand register 240, to be used to execute the operation decoded at stage 310.

For the sixteen element example discussed above, to process data elements A15, A14, . . . , A8 during a first iteration, the operand modifier can instruct the lane shift multiplexer 230 to concatenate source register 220 (which stores A15, A14, A13, A12, A11, A10, A9, and A8) and LSSR 225 (which stores A7, A6, A5, A4, A3, A2, A1, and A0) and shift the results left by 0 lanes. The results (i.e., data element A15, A14, . . . , A8) are stored at source operand register 240.

At stage 320, the source operand register 240 is accessed (e.g., by the decoder 145) to retrieve the operand to be used to execute the operation decoded at stage 310.

At stage 325, the execution unit 130 is enabled to perform the operation decoded at stage 310 on the data accessed at stage 320.

Stages 310-325 may be repeated for each iteration of a program. For example, during the second iteration, at stage 310(2) (indicating second iteration), a control signal is received and decoded to determine the instructions to be executed and the location of the data to be used to execute the instructions. Again, it is assumed that the instructions include an operation having an operand modifier that causes the system to process the data stored in source register 220 and LSSR 225 to produce an operand to be used to execute the operation decoded at stage 310(2).

At stage 315(2), an operand to be used to execute the operation decoded at stage 310(2) is produced by SR 220, LSSR 225, lane shift multiplexer 230, and lane shift value 235 and stored at source operand register 240.

For the sixteen element example discussed above, to process data elements A14, A13, . . . , A7 during a second iteration, the operand modifier can instruct the LSSR 230 to concatenate source register 220 (which stores A15, A14, A13, A12, A11, A10, A9, and A8) and LSSR 225 (which stores A7, A6, A5, A4, A3, A2, A1, and A0) and shift the results left by 1 lane. The results (i.e., data element A14, A13, . . . , A7) are stored at source operand register 240.

At stage 320(2), the source operand register 240 is accessed (e.g., by the decoder 145) to retrieve the operand to be used to execute the operation decoded at stage 310(2).

At stage 325(2), the execution unit 130 is enabled to perform the operation decoded at stage 310(2) on the data accessed at stage 320(2).

During an 8-th iteration, at stage 310(8) (indicating 8-th iteration), a control signal is received and decoded to determine the instructions to be executed and the location of the data to be used to execute the instructions. Again, it is assumed that the instructions include an operation having an operand modifier that causes the system to process the data stored in source register 220 and LSSR 225 to produce an operand to be used to execute the operation decoded at stage 310(8).

At stage 315(8), an operand to be used to execute the operation decoded at stage 310(8) is produced by SR 220, LSSR 225, lane shift multiplexer 230, and lane shift value 235 and stored at source operand register 240.

For the sixteen element example discussed above, to process data elements A8, A7, . . . , A1 during an 8-th iteration, the operand modifier can instruct the LSSR 230 to concatenate source register 220 (which stores A15, A14, A13, A12, A11, A10, A9, and A8) and LSSR 225 (which stores A7, A6, A5, A4, A3, A2, A1, and A0) and shift the results left by a 7 lanes. The results (i.e., data element A8, A7, . . . , A1) may be stored at source operand register 240.

At stage 320(8), the source operand register 240 is accessed (e.g., by the decoder 145) to retrieve the operand to be used to execute the operation decoded at stage 310(8).

At stage 325(8), the execution unit 130 is enabled to perform the operation decoded at stage 310(8) on the data accessed at stage 320(8).

As shown above, the source register 220, LSSR 225, lane shift multiplexer 230, and source operand register 240 along with an operand modifier can be used to avoid loading the same data elements from memory during each iteration of a signal processing operation.

In some implementations, the execution unit 130, source register 220, LSSR 225, lane shift multiplexer 230, and source operand register 240 described herein are located in a graphics processing unit (GPU) or a visual processing unit (VPU).

Computing devices contemplated to be within the scope of this disclosure include personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Figure 4:
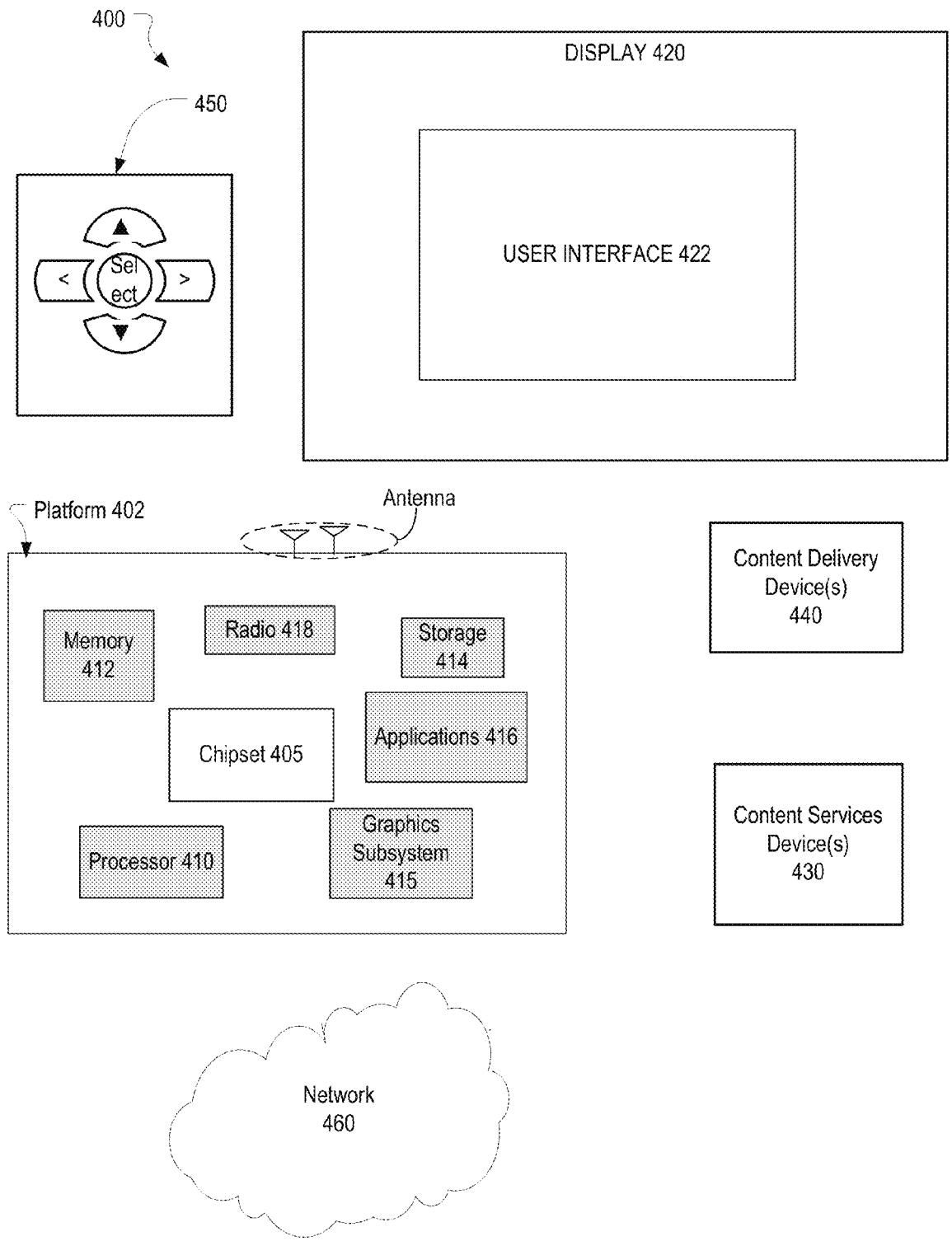
FIG. 4 is a block diagram illustrating an example system of this disclosure.

FIG. 4 illustrates an example embodiment of a system 400 of this disclosure comprising a platform 402, a display 420, content services device(s) 430, content delivery device(s) 440, and navigation controller 450. In embodiments, system 400 may be a media system although system 400 is not limited to this context. For example, components of system 400 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

In embodiments, system 400 comprises a platform 402 coupled to a display 420. Platform 402 may receive content from a content device such as content services device(s) 430 or content delivery device(s) 440 or other similar content sources. A navigation controller 450 comprising one or more navigation features may be used to interact with, for example, platform 402 and/or display 420. Each of these components is described in more detail below.

In embodiments, platform 402 may comprise any combination of a chipset 405, processor 410, memory 412, storage 414, graphics subsystem 415, applications 416 and/or radio 418. Chipset 405 may provide intercommunication among processor 410, memory 412, storage 414, graphics subsystem 415, applications 416 and/or radio 418. For example, chipset 405 may include a storage adapter (not depicted) capable of providing intercommunication with storage 414.

Processor 410 may be implemented as Complex Instruction Set Computer (CISC) or Reduced Instruction Set Computer (RISC) processors, x86 instruction set compatible processors, multi-core, or any other microprocessor or central processing unit (CPU). In embodiments, processor 410 may comprise dual-core processor(s), dual-core mobile processor(s), and so forth.

Memory 412 may be implemented as a volatile memory device such as, but not limited to, a Random Access Memory (RAM), Dynamic Random Access Memory (DRAM), or Static RAM (SRAM).

Storage 414 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In embodiments, storage 414 may comprise technology to increase the storage performance enhanced protection for valuable digital media when multiple hard drives are included, for example.

Graphics subsystem 415 may perform processing of images such as still images or video for display. Graphics subsystem 415 may be a graphics processing unit (GPU) or a visual processing unit (VPU), for example. An analog or digital interface may be used to communicatively couple graphics subsystem 415 and display 420. For example, the interface may be any of a High-Definition Multimedia Interface, DisplayPort, wireless HDMI, and/or wireless HD compliant techniques. In embodiments, graphics subsystem 415 could be integrated into processor 410 or chipset 405. In embodiments, graphics subsystem 415 could be a stand-alone card communicatively coupled to chipset 405.

The graphics and/or video processing techniques described herein may be implemented in various hardware architectures. For example, graphics and/or video functionality may be integrated within a chipset. Alternatively, a discrete graphics and/or video processor may be used. As still another embodiment, the graphics and/or video functions may be implemented by a general purpose processor, including a multi-core processor. In a further embodiment, the functions may be implemented in a consumer electronics device.

Radio 418 may include one or more radios capable of transmitting and receiving signals using various suitable wireless communications techniques. Such techniques may involve communications across one or more wireless networks. Exemplary wireless networks include (but are not limited to) wireless local area networks (WLANs), wireless personal area networks (WPANs), wireless metropolitan area network (WMANs), cellular networks, and satellite networks. In communicating across such networks, radio 418 may operate in accordance with one or more applicable standards in any version.

In embodiments, display 420 may comprise any television type monitor or display. Display 420 may comprise, for example, a computer display screen, touch screen display, video monitor, television-like device, and/or a television. Display 420 may be digital and/or analog. In embodiments, display 420 may be a holographic display. Also, display 420 may be a transparent surface that may receive a visual projection. Such projections may convey various forms of information, images, and/or objects. For example, such projections may be a visual overlay for a mobile augmented reality (MAR) application. Under the control of one or more software applications 416, platform 402 may display user interface 422 on display 420.

In embodiments, content services device(s) 430 may be hosted by any national, international and/or independent service and thus accessible to platform 402 via the Internet, for example. Content services device(s) 430 may be coupled to platform 402 and/or to display 420. Platform 402 and/or content services device(s) 430 may be coupled to a network 460 to communicate (e.g., send and/or receive) media information to and from network 460. Content delivery device(s) 440 also may be coupled to platform 402 and/or to display 420.

In embodiments, content services device(s) 430 may comprise a cable television box, personal computer, network, telephone, Internet enabled devices or appliance capable of delivering digital information and/or content, and any other similar device capable of unidirectionally or bidirectionally communicating content between content providers and platform 402 and/display 420 directly or via network 460. It will be appreciated that the content may be communicated unidirectionally and/or bidirectionally to and from any one of the components in system 400 and a content provider via network 460. Examples of content may include any media information including, for example, video, music, medical and gaming information, and so forth.

Content services device(s) 430 receives content such as cable television programming including media information, digital information, and/or other content. Examples of content providers may include any cable or satellite television or radio or Internet content providers. The provided examples are not meant to limit embodiments of the invention.

In embodiments, platform 402 may receive control signals from navigation controller 450 having one or more navigation features. The navigation features of controller 450 may be used to interact with user interface 422, for example. In embodiments, navigation controller 450 may be a pointing device that may be a computer hardware component (specifically human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of controller 450 may be echoed on a display (e.g., display 420) by movements of a pointer, cursor, focus ring, or other visual indicators displayed on the display. For example, under the control of software applications 416, the navigation features located on navigation controller 450 may be mapped to virtual navigation features displayed on user interface 422, for example. In embodiments, controller 450 may not be a separate component but integrated into platform 402 and/or display 420. Embodiments, however, are not limited to the elements or in the context shown or described herein.

In embodiments, drivers (not shown) may comprise technology to enable users to instantly turn on and off platform 402 like a television with the touch of a button after initial boot-up, when enabled, for example. Program logic may allow platform 402 to stream content to media adaptors or other content services device(s) 430 or content delivery device(s) 440 when the platform is turned "off." In addition, chip set 405 may comprise hardware and/or software support for 5.1 surround sound audio and/or high definition 7.1 surround sound audio, for example. Drivers may include a graphics driver for integrated graphics platforms. In embodiments, the graphics driver may comprise a peripheral component interconnect (PCI) Express graphics card.

In various embodiments, any one or more of the components shown in system 400 may be integrated. For example, platform 402 and content services device(s) 430 may be integrated, or platform 402 and content delivery device(s) 440 may be integrated, or platform 402, content services device(s) 430, and content delivery device(s) 440 may be integrated, for example. In various embodiments, platform 402 and display 420 may be an integrated unit. Display 420 and content service device(s) 430 may be integrated, or display 420 and content delivery device(s) 440 may be integrated, for example. These examples are not meant to limit the invention.

In various embodiments, system 400 may be implemented as a wireless system, a wired system, or a combination of both. When implemented as a wireless system, system 400 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 400 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and so forth. Examples of wired communications media may include a wire, cable, metal leads, printed circuit board (PCB), backplane, switch fabric, semiconductor material, twisted-pair wire, co-axial cable, fiber optics, and so forth.

Platform 402 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 4.

Figure 5:
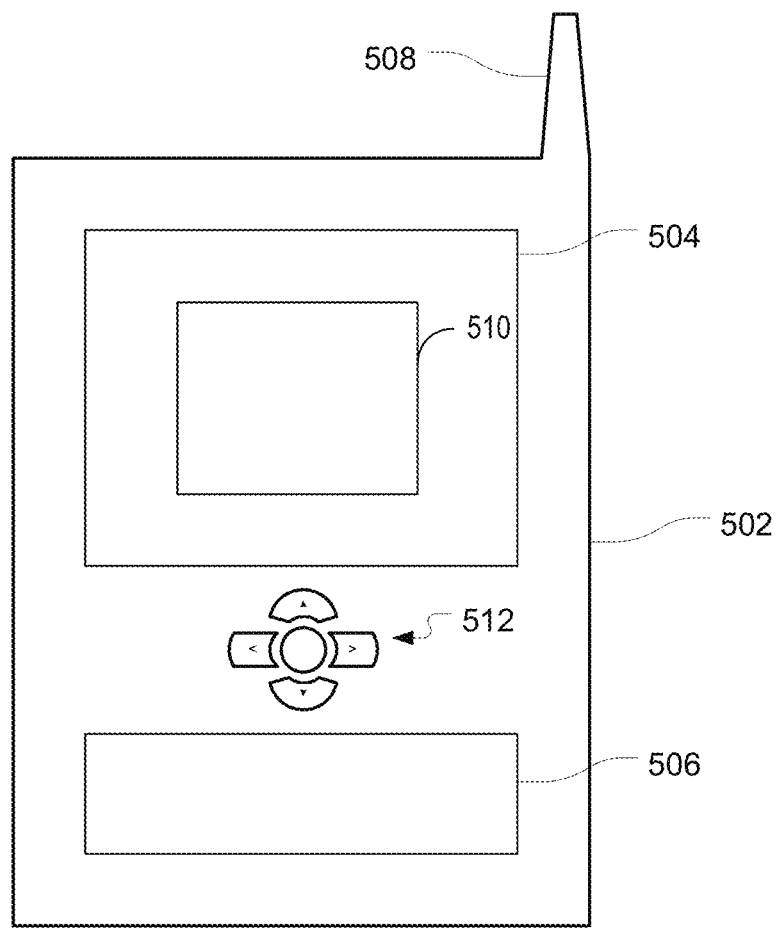
FIG. 5 is a block diagram illustrating an example small form factor device in which components of the system of FIG. 4 may be embodied.

As described above, system 400 may be embodied in varying physical styles or form factors. FIG. 5 illustrates embodiments of a small form factor device 500 in which components of system 400 may be embodied. In embodiments, for example, device 500 may be implemented as a mobile computing device having wireless capabilities. A mobile computing device may refer to any device having a processing system and a mobile power source or supply, such as one or more batteries, for example.

As described above, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 5, device 500 may comprise a housing 502, a display 504, an input/output (I/O) device 506, and an antenna 508. Device 500 also may comprise navigation features 512. Display 504 may comprise any suitable display unit for displaying information appropriate for a mobile computing device. I/O device 506 may comprise any suitable I/O device for entering information into a mobile computing device. Examples for I/O device 506 may include an alphanumeric keyboard, a numeric keypad, a touch pad, input keys, buttons, switches, rocker switches, microphones, speakers, voice recognition device and software, and so forth. Information also may be entered into device 500 by way of microphone. Such information may be digitized by a voice recognition device. The embodiments are not limited in this context.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Embodiments may therefore include a system including a storage device to store a program that includes code to iteratively process contiguous data elements. The system may further include a first register to store a first set of the contiguous data elements. A second register to store a second set of the contiguous data elements, and a multiplexer. The multiplexer receives the first set of the contiguous data elements from the first register and the second set of the contiguous data elements from the second register to, for each of a plurality of iterations, and selects a corresponding set of contiguous data elements to be used during the execution of an operation for the iteration, wherein the selected corresponding set of contiguous data elements is to be a subset of the first set of the contiguous data elements concatenated with the second set of the contiguous data elements. The system also includes an execution unit to execute the operation for the iteration using the selected corresponding set of contiguous data elements.

Embodiments also may include a method including loading a first set of data elements in a first register and a second set of data elements in a second register, wherein the first set of data elements and the second set of data elements are used during the execution of a program to iteratively process the data elements. For each of a plurality of iterations, the method further includes selecting a corresponding set of data elements to be used during the execution of an operation for the iteration from the first set of data elements stored in the first register and the second set of data elements stored in the second register.

Embodiments also may include a computer readable medium including a set of instructions which, if executed by a processor, cause a computer to load a first set of data elements in a first register and a second set of data elements in a second register, wherein the first set of data elements and the second set of data elements are to be used during an execution of a program, and wherein the program includes code to iteratively process contiguous data elements and cause a computer to execute the program where, for each of a plurality of iterations, execution of the program includes execution of an operation for the iteration using a corresponding set of data elements selected, wherein the selected corresponding set of data elements are selected from the first set of data elements stored in the first register and the second set of data elements stored in the second register.

Embodiments also may include a system including a first storage to store a first set of data elements, a second storage to store a second set of data elements, and a multiplexer to receive the first set of data elements from the first register and the second set of data elements from the second register to, for each of a plurality of iterations of an algorithm, select a corresponding set of data elements to be used during the execution of an operation for the iteration, wherein the selected corresponding set of data elements is to be a subset of the first set of data elements concatenated with the second set of data elements.

Embodiments are applicable for use with all types of semiconductor integrated circuit ("IC") chips. Examples of these IC chips include but are not limited to processors, controllers, chipset components, programmable logic arrays (PLAs), memory chips, network chips, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments of the present invention are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments of the invention. Further, arrangements may be shown in block diagram form in order to avoid obscuring embodiments of the invention, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments of the invention, it should be apparent to one skilled in the art that embodiments of the invention can be practiced without, or with variation of, these specific details. The description is thus to be regarded as illustrative instead of limiting.

Some embodiments may be implemented, for example, using a machine or tangible computer-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

Those skilled in the art will appreciate from the foregoing description that the broad techniques of the embodiments of the present invention can be implemented in a variety of forms. Therefore, while the embodiments of this invention have been described in connection with particular examples thereof, the true scope of the embodiments of the invention should not be so limited since other modifications will become apparent to the skilled practitioner upon a study of the drawings, specification, and following claims.

I claim:

1. A system comprising:
   a storage device to store a program that includes code to iteratively process contiguous data elements;
   a first register to store a first set of the contiguous data elements, wherein the first register is a source register;
   a second register to store a second set of the contiguous data elements, wherein the second register is a lane shift supplement register; and
   a lane shift multiplexer to,
      receive the first set of the contiguous data elements from the first register and the second set of the contiguous data elements from the second register, for each of a plurality of iterations, and
      select a corresponding set of contiguous data elements to be used during the execution of an operation for the iteration, wherein the selected corresponding set of contiguous data elements is to be a subset of the first set of the contiguous data elements concatenated with the second set of the contiguous data elements; and
   an execution unit to execute the operation for the iteration using the selected corresponding set of contiguous data elements, wherein the execution unit includes a source operand register having an operand modifier that indicates a lane shift value.

2. The system of claim 1 wherein the contiguous data elements are derived from pixel values of an image.

3. The system of claim 1, wherein the code to iteratively process the data elements includes a filtering algorithm.

4. The system of claim 1, wherein the code to iteratively process the data elements includes a convolution algorithm.

5. The system of claim 1, wherein the first register and second register are SIMD registers.

6. The system of claim 1, wherein the first register, second register, and multiplexer are internal to the execution unit.

7. The system of claim 6, wherein the execution unit is part of a graphics processor.

8. A method comprising:
   loading a first set of data elements in a first register and a second set of data elements in a second register, wherein the first register is a source register, and the second register is a lane shift supplement register, and the first set of data elements and the second set of data elements are contiguous and used during the execution of a program to iteratively process the data elements;
   for each of a plurality of iterations, selecting a corresponding set of data elements to be used during the execution of an operation for the iteration from the first set of data elements stored in the first register and the second set of data elements stored in the second register based at least in part on a lane shift value from an operand modifier, wherein for each of a plurality of iterations, selecting the corresponding set of data elements includes:
concatenating the first set of data elements and the second set of data element; and
selecting the set of data elements from the concatenated data elements based on a shift value for the iteration; and
for each of the plurality of iterations, executing the operation for the iteration using the selected set of data elements.

9. The method of claim 8, wherein the data elements are derived from pixel values of an image.

10. The method of claim 8, wherein the program to iteratively process the data elements includes a filtering algorithm.

11. The method of claim 8, wherein the program to iteratively process the data elements includes a convolution algorithm.

12. A non-transitory computer readable medium comprising a set of instructions which, if executed by a processor, cause a computer to:
load a first set of data elements in a first register and a second set of data elements in a second register, wherein the first register is a source register, and the second register is a lane shift supplement register, and the first set of data elements and the second set of data elements are contiguous and are to be used during an execution of a program, and wherein the program includes code to iteratively process contiguous data elements; and
execute the program where, for each of a plurality of iterations, execution of the program includes execution of an operation for the iteration using a corresponding set of data elements selected, wherein the selected corresponding set of data elements are selected from the first set of data elements stored in the first register and the second set of data elements stored in the second register based at least in part on a lane shift value from an operand modifier, wherein for each of a plurality of iterations, selecting the corresponding set of data elements includes:
concatenating the first set of data elements and the second set of data element; and
selecting the set of data elements from the concatenated data elements based on a shift value for the iteration.

13. The non-transitory computer readable medium of claim 12, wherein the data elements are derived from pixel values of an image.

14. The non-transitory computer readable medium of claim 12, wherein the code to iteratively process the data elements includes a filtering algorithm.

15. The non-transitory computer readable medium of claim 12, wherein the code to iteratively process the data elements includes a convolution algorithm.

16. A system comprising:
a first storage to store a first set of data elements, wherein the first storage is a source register;
a second storage to store a second set of data elements, wherein the second storage is a lane shift supplement register;
a multiplexer to receive the first set of data elements from the first storage and the second set of data elements from the second storage, for each of a plurality of iterations of an algorithm, and select a corresponding set of data elements to be used during the execution of an operation for the iteration, wherein the selected corresponding set of data elements is to be a subset of the first set of data elements concatenated with the second set of data elements based at least in part on a lane shift value from an operand modifier; and
an execution unit to execute the operation for the iteration using the selected corresponding set of data elements, wherein the first set of data elements and the second set of data elements are contiguous data elements.

17. The system of claim 16, wherein the first storage, second storage, and multiplexer are internal to the execution unit.

18. The system of claim 16, wherein the execution unit is part of a graphics processor.

19. The system of claim 16, wherein the first storage and second storage are SIMD registers.

20. The system of claim 16, wherein the contiguous data elements are derived from pixel values of an image.

21. The system of claim 16, wherein the algorithm includes a filtering algorithm.

22. The system of claim 16, wherein the algorithm includes a convolution algorithm.

* * * * *